UNITED STATES PATENT OFFICE.

JOHN FORDRED, OF BLACKHEATH, ENGLAND.

IMPROVED METHOD OF PURIFYING HYDROCARBON OILS.

Specification forming part of Letters Patent No. 54,267, dated April 24, 1866.

*To all whom it may concern:*

Be it known that I, JOHN FORDRED, of Blackheath, in the county of Kent, England, have invented certain new and useful Improvements in the Treatment of Certain Hydrocarbon Oils and of Products Obtained Therein and in the Refining of Petroleum; and I hereby declare the following to be a full, clear, and exact description of the same.

In the ordinary purification of oils derived from the distillation of coal, shale, or peat at low temperatures, and which are commercially known as "coal," "shale," and "peat oils," it is usual to treat the crude or distilled products with sulphuric acid as a preliminary process of purification.

Now, my invention has for its object the substitution of an alkaline preliminary treatment in lieu of the acid process. I have found that when the crude or distilled oils or products are submitted to the previous action of a caustic alkali a very large proportion of the coloring matter and other constituents are separated therefrom, and that, when such partially-purified oils are subsequently treated according to the ordinary or any well-known method of purification not only is the subsequent purification facilitated, but the proportions of acid and alkali are materially lessened, and the products obtained are of superior quality.

In carrying out this first part of my invention I proceed as follows, but I adopt modifications according to the quality of the oil under treatment: I place the oil, either crude or distilled, in a suitable vessel provided with an agitator, and to every one hundred parts, by measure, of oil I add about from two to five parts, by measure, of a solution of caustic soda marking 37° Baumé, or thereabouts. Caustic potash may be employed, but I prefer soda, on account of its cheapness. The proportion of the alkaline solution will vary according to the quality of the oil to be operated upon, as in some cases it will be found advisable to increase the amount, in others it may be diminished; but I have found that from two to five per cent., by measure, of the alkaline solution generally effects the desired purpose. I then, if necessary, elevate the temperature of the mixture; but, by preference, I do not exceed 100° Fahrenheit. Agitation is continued until thorough admixture of the alkali and the oil has been effected. The flocculent and other insoluble matters which have been formed are then allowed to subside, and the clear supernatant oil is to be drawn off. Oil thus treated may be acted upon by a small quantity of sulphuric acid, and after agitation and subsidence of the impurities thus separated, the clear oil may be drawn off and be again submitted to an alkaline treatment; but the proportion of alkali (for example of caustic soda) which will be found necessary for this operation will not generally exceed about one part, by measure, of a solution of caustic soda marking 37° Baumé, or thereabouts, to every one hundred parts, by measure, of the oil under treatment. These processes may, if necessary, be repeated, or the oil, after the preliminary alkaline treatment, may be subjected direct to distillation, or, as before mentioned, may be submitted to any of the well-known processes of purification.

After the oils have been subjected to any of the foregoing processes of purification or refining, or when such oils have been refined by any other process, I have found that a turbidity which is possessed by some of these oils may be removed, and that they may be made bright by filtration through a bed or filter composed of what is known as "Fuller's earth," or that the Fuller's earth may be mixed with the oil and then allowed to subside. The oil will then be found to be much brighter and quite freed from the dull or opaque appearance it originally possessed.

In the treatment of the crude or distilled oils with the caustic alkali, as before mentioned, a deposit is obtained, and a deposit also results from the treatment of the oils with sulphuric acid.

Now, another part of my invention consists in the suitable admixture of these deposits or foots, so as to free or liberate the compounds or bodies united with the alkali on the one hand and the acid on the other, and in addition to obtain a residuum of a sulphate of the alkali. I effect the separation of the salt thus formed by the addition of a small proportion of water with the injection of steam and the oils, grease, or compounds thus liberated may be separated and stored for use.

The resulting solution of sulphate of soda or potash may be evaporated, and may be employed in the arts.

Having thus described my invention and the manner in which the same is or may be carried into effect, I claim—

The employment of a solution of caustic soda or potash as a preliminary treatment or process of purification of the crude or of the distilled oils or hydrocarbons resulting from the distillation of coal, shale, or peat at a low temperature.

In testimony whereof I have signed my name to this specification in the presence of two subscribing witnesses.

JOHN FORDRED.

Witnesses:
 EDWARD CLEMENT DAVIES,
 P. HAMBLY.